C. F. W. TABLER.
PLANETARY TRANSMISSION MECHANISM.
APPLICATION FILED OCT. 29, 1909.

956,227.

Patented Apr. 26, 1910.

WITNESSES
M. A. Atwood
Frank G. Parker

INVENTOR
Charles F. W. Tabler,
By Henry W. Williams
Att'y.

UNITED STATES PATENT OFFICE.

CHARLES F. W. TABLER, OF BOSTON, MASSACHUSETTS.

PLANETARY TRANSMISSION MECHANISM.

956,227.　　　　　　　Specification of Letters Patent.　　Patented Apr. 26, 1910.

Application filed October 29, 1909. Serial No. 525,259.

*To all whom it may concern:*

Be it known that I, CHARLES F. W. TABLER, a subject of the Emperor of Germany, residing in Boston, in the county of Suffolk and State of Massachusetts, have invented new and useful Improvements in Planetary Transmission Mechanism, of which the following is a specification.

This invention relates to a high and low speed transmission-mechanism of the planetary type, and more specifically to a planetary friction-mechanism as distinguished from a planet-gear (in which cog-wheels are employed), and it is applicable more particularly, but not necessarily exclusively, to automobile-mechanisms, where a gear adapted to transmit a plurality of speeds is practically necessary.

The principal objects of this invention are to obtain greater accuracy of adjustment than is the case in the ordinary planet-gear, to prevent slipping or back-lash, to lengthen the possible term of service by lessening the wear of the parts, and to produce a two-speed transmission-mechanism in which a high degree of efficiency is combined with economy in operation and noiselessness while in use.

The nature of the invention is fully described below, and illustrated in the accompanying drawings, in which:—

Figure 1:
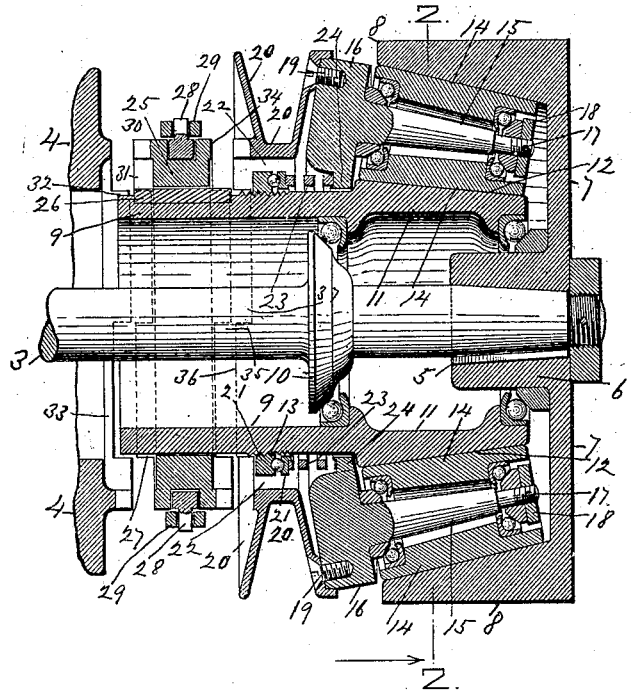
Figure 2:
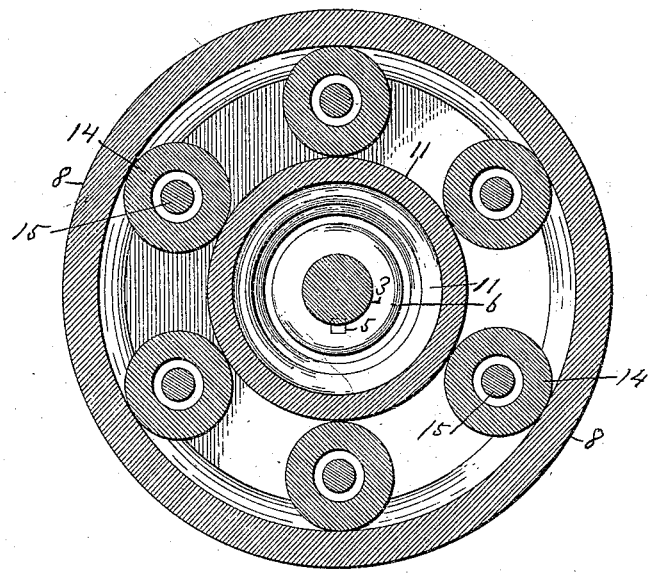

Figure 1 is a longitudinal section of a planetary transmission-mechanism embodying my invention or improvement. Fig. 2 is a cross section taken on line 2—2, Fig. 1, looking toward the right.

Similar numerals of reference indicate corresponding parts.

Reference-numeral 3 represents the crank-shaft, or an extension thereof, extending through the frame of the engine, a portion of said frame being represented at 4, and on the end of this shaft is splined at 5 the hub 6 of the wheel 7 from whose rim extends a flange 8 whose inner surface is beveled inward toward the main portion of wheel 7, the parts 6, 7 and 8 being preferably integral.

9 is a sleeve adapted to rotate on the hub 5 and the flange 10 on the shaft 3 by means of suitable anti-friction bearings. The outer surface of the portion 11 of this sleeve is beveled at 12 whereby such portion 11 constitutes a cone, and the beveled surface 12 flares somewhat as illustrated with relation to the inner surface of the flange 8, the surfaces of the two portions 11 and 8 constituting inner and outer cones flaring rearward from the wheel 7. At 13 the sleeve is screw-threaded for the purpose below described.

Within the annular space between the cones 11 and 8 are a series of friction-rollers 14 (six being illustrated in the drawings but a greater number being frequently employed), said friction-rollers being tapered to make continuous contact throughout their entire length with the inner surfaces of said cones. These rollers are tubular and are mounted by means of anti-friction bearings on pins 15 which extend from and are preferably integral with a ring 16 surrounding the sleeve 9 near the conical portion 11 thereof, but not mounted on said sleeve. The outer ends of the pins, that is, the ends nearest the wheel 7, are provided with extensions 17 on which nuts 18 are screwed, thus in connection with the ring 16 supporting the rollers 14 and retaining them in proper position. This ring or roller-support 16 is rigidly secured at 19 to the V-shaped belt-pulley 20 which transmits the power—in an automobile to the rear wheels. This pulley 20 preferably does not have its bearings on the sleeve 9, but surrounds it as illustrated in Fig. 1, and is supported by the ring 16. A thrust-bearing 21 is screwed at 13 to the sleeve 9, in the annular space 22 between the main portion of the pulley 20 and said sleeve, and a spiral spring 23 surrounds said sleeve between the thrust-bearing and an annular shoulder 24 integral with the ring or roller-support 16, said spring operating to hold the rollers 14 into frictional contact with the cones 11 and 8.

A ring 25 on the sleeve 9 is prevented from relative rotative movement by the lock 26, and is adapted to slide longitudinally in the slot 27 on said sleeve. This ring 25 is provided with an annular ring 28 and is operated in its sliding movement between the stationary portion 4 and the pulley 20 by a suitable lever 29. The ring 25 is furthermore provided with suitable teeth and notches 30, 31 on the side next the stationary portion 4 which is provided with suitable teeth and notches 32, 33, and on the side next the pulley 20 the ring 25 is provided with suitable teeth and notches 34, 35 adapted to engage with suitable teeth and notches 36, 37 on the pulley 20. This ring 25 is therefore, a clutch-member of ordinary construction adapted to be moved by the lever 29 into engagement with the stationary portion 4 or the pulley 20, and its construction is not claimed to be new nor do I confine myself to the particular form of clutch-mechanism illustrated.

In the drawings, the clutch-mechanism is shown as in "neutral" position, in which neither high nor low speed is transmitted to the driving shaft, or axle of the rear wheel in case the mechanism is applied to an automobile.

If high speed is desired, the clutch-member or sliding ring 25 is moved into engagement with the pulley 20 which is rigid with the ring or roller-holder 16 as above described, the rollers 14 being held in frictional contact with the outer and inner cones 8 and 11. The effect of thus locking the clutch-mechanism with the pulley 20 is that the outer cone 8, rollers 14, and inner cone 11 integral with the sleeve 9 are all locked together and are practically of one piece with the ring 16, pulley 20 and clutch-member 25. Hence the shaft transmits rotation to the wheel 7 and outer cone (or flange) 8, and the rollers are held between the cone 8 and the cone 11 and do not turn around the pins 15 and have no movement relative with the cones, but revolve around the shaft with the sleeve 9 and inner and outer cones, and at the same time the clutch-member 25 rotates with the sleeve 9 and the pulley 20, and the ring 16 rigid with the pulley and integral with the spindles 15 rotates with the clutch-member and sleeve. Thus the rotations of the shaft are transmitted to the pulley and high speed is communicated to the rear driving wheels of the automobile. In other words, the locking of the clutch-member to the roller-holder prevents planetary movement of the roller-holder and rollers.

If low speed is desired, the clutch-member is moved into engagement with the frame or stationary part 4 of the machine, and is held stationary, and the sleeve 9 and inner cone 11 are held stationary by the clutch-member, and the outer cone 8 causes the rollers to roll between its inner surface and the stationary inner cone 11, and the roller-holder 16 to rotate at a low speed, imparting corresponding rotation to the pulley 20 and transmitting a low speed to the rear shaft or axle.

When the clutch-mechanism is in neutral position, as shown in the drawings, it is not in engagement with either the stationary portion or the pulley which is rigid with the ring 16, the inner cone is allowed to rotate in the opposite direction to the outer cone, and the rollers revolve on their spindles or pins 15 which, together with the ring 16 and pulley 20, remain stationary.

It is evident that in this device the adjustment is not only accurate but automatic by reason of the springs 23, and that as there are no teeth employed the mechanism is practically noiseless, and lost power at high speed is prevented.

While the pulley 20 is admirably adapted for transmitting the power at the speed communicated to it, I do not confine myself to a belt pulley, as any suitable and well-known mechanism adapted to be connected with the ring 16 and to transmit the speed movements of said ring may be employed.

Having thus fully described my invention, what I claim, and desire to secure by Letters Patent, is:—

1. In a planetary transmission-mechanism, a driving-shaft, a wheel rigid on the shaft and provided with an annular flange constituting an outer cone, a sleeve mounted on the shaft and integral with an inner cone, a ring surrounding the sleeve and provided with spindles extending into the annular space between the two cones, friction-rollers mounted on the spindles, a transmission-wheel or its equivalent rigid with said ring, and a clutch-member sliding longitudinally on the sleeve and adapted to be moved into engagement with said transmission-wheel or equivalent or with a stationary portion of the machine.

2. In a planetary transmission-mechanism, a driving or crank-shaft, an outer hollow cone rigid on the shaft, an inner cone mounted non-rigidly around the shaft within the outer cone and provided with a tubular extension or sleeve, a series of friction-rollers held between and in contact with the two cones, a roller-holder supporting the rollers in said position, a transmission-pulley or its equivalent connected with the roller-holder, and a clutch-member in engagement with the sleeve and adapted to slide longitudinally thereon into engagement with the mechanism whereby the roller-holder, rollers, cones, sleeve, and pulley or its equivalent will revolve together around the shaft without relative movement of the rollers, thus transmitting high speed, and whereby the clutch-member may be moved into engagement with the stationary portion of the machine, thus transmitting low speed.

In testimony whereof I have signed my name to this specification in the presence of two subscribing witnesses.

CHARLES F. W. TABLER.

Witnesses:
HENRY W. WILLIAMS,
M. A. ATWOOD.